United States Patent
Lee (10) Patent No.: US 10,005,183 B2
(45) Date of Patent: Jun. 26, 2018

(54) APPARATUS FOR PROVIDING ROBOT MOTION DATA ADAPTIVE TO CHANGE IN WORK ENVIRONMENT AND METHOD THEREFOR

(71) Applicant: ELECTRONICS AND TELECOMMUNICATIONS RESEARCH INSTITUTE, Daejeon (KR)

(72) Inventor: Hooman Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 38 days.

(21) Appl. No.: 15/219,066

(22) Filed: Jul. 25, 2016

(65) Prior Publication Data

US 2017/0028552 A1 Feb. 2, 2017

(30) Foreign Application Priority Data

Jul. 27, 2015 (KR) ........................ 10-2015-0106075

(51) Int. Cl.
*B25J 9/16* (2006.01)

(52) U.S. Cl.
CPC ... *B25J 9/1664* (2013.01); *G05B 2219/40475* (2013.01); *G05B 2219/40512* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,004,016 A * | 12/1999 | Spector | ................. | B25J 9/1666 700/247 |
| 6,167,328 A * | 12/2000 | Takaoka | ................. | B25J 9/1671 318/568.1 |
| 7,899,577 B2 * | 3/2011 | Ban | ........................ | B25J 9/1692 318/568.11 |
| 7,974,737 B2 * | 7/2011 | Tilove | .................... | B25J 9/1666 700/253 |
| 8,504,188 B2 * | 8/2013 | Keibel | ..................... | A61N 5/10 700/184 |
| 8,843,234 B2 * | 9/2014 | Tao | ......................... | B25J 9/1674 700/245 |
| 8,874,300 B2 * | 10/2014 | Allard | .................... | H04L 67/12 700/245 |
| 9,545,717 B2 * | 1/2017 | Kim | ...................... | B25J 9/1612 |
| 2004/0193293 A1 * | 9/2004 | Watanabe | ............. | B25J 9/1638 700/56 |
| 2004/0199290 A1 * | 10/2004 | Stoddard | ................ | B25J 9/1669 700/248 |

(Continued)

FOREIGN PATENT DOCUMENTS

KR 10-2014-0119568 A 10/2014

*Primary Examiner* — Jonathan L Sample (57) ABSTRACT

An apparatus and method for providing robot work data adaptive to changes in a work environment. The apparatus may include a robot work data provider, a robot work data processor, and a robot motion data provider. The apparatus and method define a robot's work using an obtained work path and obtained environmental information, and provide robot motion data to control robot motions to actively adapt to changes in its work environment.

10 Claims, 5 Drawing Sheets

(56) References Cited

U.S. PATENT DOCUMENTS

| | | | |
|---|---|---|---|
| 2005/0125099 A1* | 6/2005 | Mikami | G06N 3/008 700/245 |
| 2006/0069466 A1* | 3/2006 | Kato | B25J 9/1682 700/264 |
| 2008/0059015 A1* | 3/2008 | Whittaker | G05D 1/0274 701/23 |
| 2009/0019410 A1* | 1/2009 | Yoshizawa | B25J 9/1664 716/119 |
| 2010/0057255 A1* | 3/2010 | Ra | B25J 5/00 700/253 |
| 2011/0098857 A1* | 4/2011 | Yoshiike | B62D 57/032 700/246 |
| 2011/0106308 A1* | 5/2011 | Eliasson | B25J 9/1664 700/250 |
| 2013/0138246 A1* | 5/2013 | Gutmann | G05D 1/0231 700/253 |
| 2014/0172143 A1* | 6/2014 | Fudaba | B25J 9/1656 700/108 |
| 2014/0229006 A1* | 8/2014 | Rumping | B25J 9/1643 700/255 |
| 2014/0297034 A1* | 10/2014 | Lee | B25J 9/163 700/253 |
| 2015/0183114 A1* | 7/2015 | Takahashi | B25J 9/1692 700/253 |
| 2015/0273685 A1* | 10/2015 | Linnell | B25J 9/1664 700/184 |

\* cited by examiner

APPARATUS FOR PROVIDING ROBOT MOTION DATA ADAPTIVE TO CHANGE IN WORK ENVIRONMENT AND METHOD THEREFOR

CROSS-REFERENCE TO RELATED APPLICATION(S)

This application claims priority from Korean Patent Application No. 10-2015-0106075, filed on Jul. 27, 2015, in the Korean Intellectual Property Office, the disclosure of which is incorporated herein by reference in its entirety.

BACKGROUND

1. Field

The following description relates to the provision of robot motion data for controlling a robot's motions so that it may be employed for work, and more particularly, to an apparatus and method for providing robot motion data that reflects environmental information so as to allow the robot to work adaptively to changes in its work environment.

2. Description of Related Art

The prior or existing industrial robots have simply determined accurate work positions or work paths and merely repeated the same task, but as the production system is changing into a small quantity batch production system, a need for robots to work adaptively to various changes in the work environment is growing.

There are mainly two methods for controlling robot motions so that the robot can work adaptively to changes in its environment.

One method is explicit programming by which a programmer manually programs each motion, and another method is programming by demonstration—a technique in which an instructor teaches a robot by demonstrating actions.

In the former method, a considerable amount of time must be invested in order to control the robot's motions, and reprogramming is needed even for a slight change in the robot's task, thus deeming it inefficient. However, due to the lack of alternative methods available in the industrial application, such programming is still being used.

In the latter method, more intuitive control of robot motions is available and a definition of the robot's work is abstracted and then stored, and hence a slight change in the robot's task does not entail reprogramming. However, it is not easy to build a body of knowledge to define the work, nor is it easy to achieve a level of reliability sufficient to be used in industrial application, which is why the method of programming by demonstration is generally employed for service robots. Adaptability to variations in the environment is very important, especially for the service robots that work in atypical work environments.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to an apparatus and method for providing robot motion data, which can define a robot's work using an obtained work path and obtained environmental information and can control robot motions so that a robot can actively respond to a change in the work environment.

In one general aspect, there is provided an apparatus for providing robot work data adaptive to changes in a work environment, the apparatus including: a robot work data provider configured to generate robot work data that contains obtained robot control command data and obtained environmental information; a robot work data processor configured to: optimize a robot's work path that is contained in the robot work data; interpolate the work path using via-point information contained in the robot work data; define details of work to be executed by the robot by translating the robot work data; and process robot work data to contain the defined details of work and the interpolated work path; and a robot motion data provider configured to generate playback work data to control a robot motion so that the robot playbacks a repetitive motion to carry out the work, as well as the work path contained in the robot work data or to generate adaptive work data to control the robot motion so that the work path is changed by updating the work path while applying the details of work to the interpolated work path.

The robot work data provider may include a robot control command data obtainer configured to obtain the robot control command data from a user or obtain previously stored robot control command data; an environmental information obtainer configured to obtain the environmental information that contains information about a target of work and work environment and work path of the robot; and a robot work data generator configured to generate the robot work data that contains both the robot control command data and environmental information obtained.

The robot work data processor may include a work path optimizer configured to optimize the work path by smoothing or performing regression on the work path contained in the robot work data; a work path interpolator configured to perform interpolation between via-points on the optimized work path using via-point information contained in the robot work data; and a robot work adjuster configured to define the details of work to be executed by the robot by translating the robot work data and process the robot work data to contain the defined details of work and the interpolated work path.

The robot work data provider may include a playback work data generator configured to generate playback work data to control a robot motion so that the robot can playback the details of work and the work path regarding repetitive motion to carry out the work which is contained in the processed robot work data, and an adaptive work data generator configured to update the work path by reflecting the details of work to the interpolated work path at predesignated intervals, and generate the adaptive work data to control the robot motion so that the robot can work according to the updated work path and the details of work.

The robot work data provider may include a playback decider configured to obtain information from the user as to whether the user will use a playback function, in order to determine whether to generate the playback work data, and a robot work data temporary storage configured to temporarily store the processed robot work data, in order to generate the adaptive work data.

In another general aspect, there is provided a method for providing robot work data adaptive to changes in a work environment, the method including: generating robot work data that contains obtained robot control command data and obtained environmental information; optimizing a work path that is contained in the robot work data; interpolating the work path using via-point information contained in the robot work data; defining details of work to be executed by the robot by translating the robot work data; and processing robot work data to contain the defined details of work and the interpolated work path; and generating playback work data to control a robot motion so that the robot playbacks a repetitive motion to carry out the work, as well as the work path contained in the robot work data, or generating adaptive work data to control the robot motion so that the work path is changed by updating the work path while reflecting the details of work to the interpolated work path.

The generating of the robot work data may include obtaining the robot control command data from a user or obtaining previously stored robot control command data; obtaining the environmental information that contains information about an target of work and work environment and work path of the robot; and generating the robot work data that contains both the robot control command data and environmental information obtained.

The processing of the robot work data may include: optimizing the work path by smoothing or performing regression on the work path contained in the robot work data; performing interpolation between via-points on the optimized work path using via-point information contained in the robot work data; and defining the details of work to be executed by the robot by translating the robot work data and processing the robot work data to contain the defined details of work and the interpolated work path.

The generating of the robot motion data may include: generating playback work data to control a robot motion so that the robot can playback the details of work and the work path regarding repetitive motion to carry out the work which is contained in the processed robot work data; updating the work path by reflecting the details of work to the interpolated work path at predesignated intervals; and generating the adaptive work data to control the robot motion so that the robot can work according to the updated work path and the details of work.

The generating of the robot motion data may include obtaining information from the user as to whether the user will use a playback function, in order to determine whether to generate the playback work data, and temporarily storing the processed robot work data, in order to generate the adaptive work data.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present invention will be described more fully hereinafter with reference to the accompanying drawings, in which exemplary embodiments of the invention are shown. The invention may, however, be embodied in many different forms and should not be construed as being limited to the embodiments set forth herein.

Also, irrelevant details have been omitted from the drawings for increased clarity and conciseness, and similar parts are indicated by similar reference numerals throughout the detailed description.

Throughout the detailed description, unless explicitly described to the contrary, the word "comprise" and variations such as "comprises" or "comprising", will be understood to imply the inclusion of stated elements but not the exclusion of any other elements.

Hereinafter, exemplary embodiments of an apparatus and method for providing motion data of a robot that adapts to changes in work environment will be described with reference to the accompanying drawings.

Figure 1:
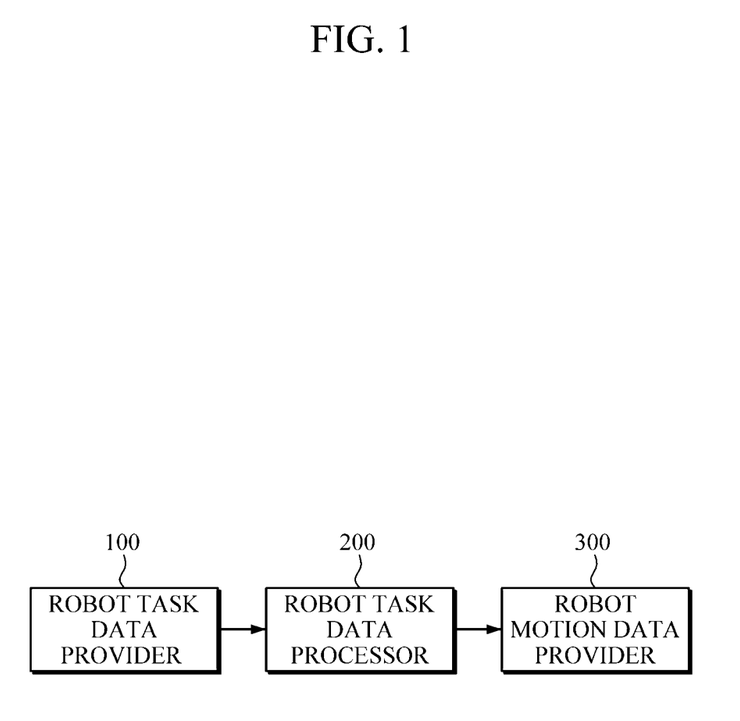
FIG. 1 is a diagram illustrating an apparatus for providing robot motion data for using a robot at work.

FIG. 1 is a diagram illustrating an apparatus for providing robot motion data for using a robot at work.

Referring to FIG. 1, the apparatus 1000 for providing robot motion data according to an exemplary embodiment includes a robot task data provider 100, a robot task data processor 200, and a robot motion data provider 300.

The robot task data provider 100 may generate and output robot task data that contains both obtained robot control command data and environmental information.

The robot task data provider 100 will be described in detail with reference to FIG. 2.

The robot task data processor 200 may optimize a robot's work path that is contained in the robot task data. Then the robot work data processor 200 may interpolate the optimized work path using via-point information contained in the robot work data, define details of work to be executed by the robot by translating said work data, and process said work data to contain the defined details of the work and the interpolated work path.

The robot work data processor 200 will be described in detail with reference to FIG. 3.

The robot motion data provider 300 may generate playback work data to control the robot's motions so that the robot can playback repetitive motion while conducting work that follows the work path contained in the processed robot work data, or the robot motion data provider 300 may generate adaptive work data to control the robot motion so that the work path is changed by updating the work path while reflecting the details of work to the interpolated work path.

The robot motion data provider 300 will be described in detail with reference to FIG. 4.

Figure 2:
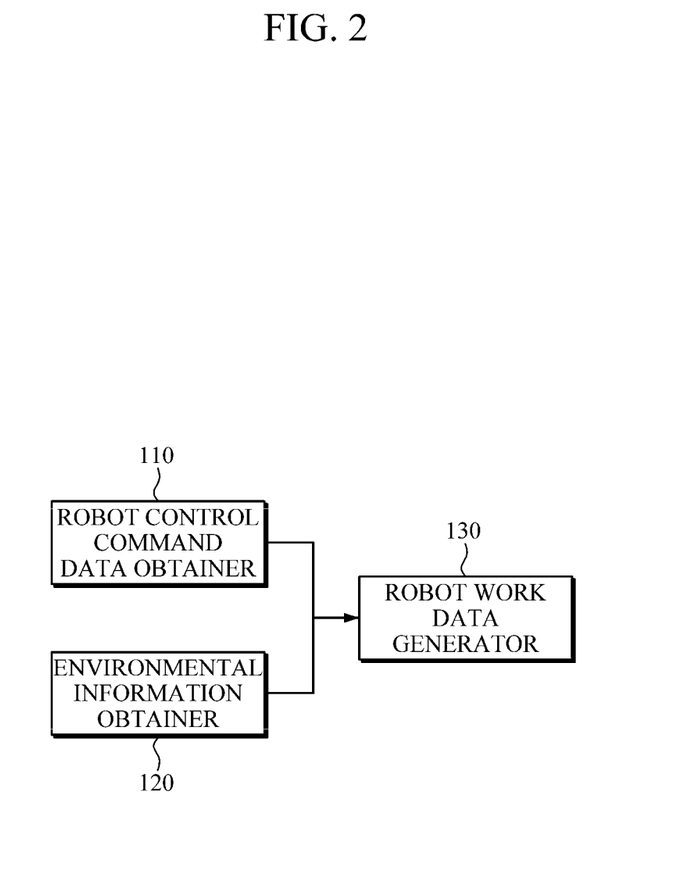
FIG. 2 is a diagram illustrating in detail the robot work data provider shown in FIG. 1.

FIG. 2 is a diagram illustrating in detail the robot work data provider shown in FIG. 1.

Referring to FIG. 2, the robot work data provider 100 includes a robot control command data obtainer 110, an environmental information obtainer 120, and a robot work data generator 130.

The robot control command data obtainer 110 may obtain robot control command data from a user or may obtain robot control command data that has been stored in advance.

The robot control command data may refer to data that contains commands to control motions of the robot, and it may be received from the user or may be the existing control command data that is retrieved from a database or a storage unit according to the exemplary embodiment.

The environmental information obtainer 120 may obtain environmental information that contains information about a target of work, a work environment, and work path of the robot.

The environmental information may contain information about a target of work, a work environment, and a work path of the robot, in which said target of work may refer to one for which the robot conducts a sequence of particular motions; the work path may refer to a position or an overall distance covered by the robot in order to carry out motions; and the work environment may refer to an external environment of the robot that varies in real time while the robot performs a sequence of particular motions.

The robot work data generator 130 may generate robot work data that contains the obtained robot control command data and environmental information.

According to the exemplary embodiment, the robot work data refers to data that contains robot control command data and environmental information and contains information that can be used in defining a robot's work that consists of a set of movements which are sequentially connected for a particular purpose. The robot work data may include a work path, working movements, a work sequence, a target of work, a work duration, and the like.

Figure 3:
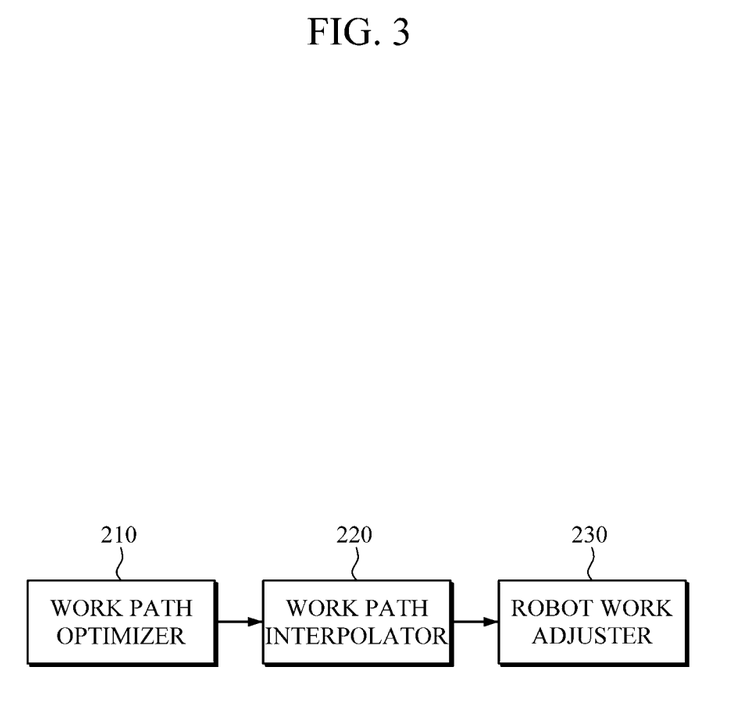
FIG. 3 is a diagram illustrating in detail the robot work data processor shown in FIG. 1.

FIG. 3 is a diagram illustrating in detail the robot work data processor shown in FIG. 1.

Referring to FIG. 3, the robot work data processor 200 includes a work path optimizer 210, a work path interpolator 220, and a robot work adjuster 230.

The work path optimizer 210 may hone a robot's work path by smoothing or performing regression on a work path contained in the robot work data.

According to the exemplary embodiment, the smoothing may refer to a data processing method that reduces or eliminates variations or discontinuity in data. In the process of said smoothing, important information of a particular section that is removed concurrently with noise or a section with abruptly discontinued can accidently be damaged, so specific information of the sections that are to be removed may be extracted and preserved while the remaining sections are standardized. However, aspects of the present invention are not limited to the above description, such that any smoothing methods that can reduce overall discontinuity or abrupt variability in data can be used.

In addition, according to the exemplary embodiment, the regression may refer to a method for adjusting a work path by performing regression analysis to estimate a relationship between one dependent variable y and two or more independent variables x1, x2, . . . using the least square. However, aspects of the present disclosure are not limited to the above description, such that any methods that can optimize the work path can be used.

The work path interpolator 220 may perform interpolation between via-points on the optimized work path using via-point information contained in the robot work data.

The via-point may refer to a designated point that belongs to the robot's work path, and according to the exemplary embodiment, the via-points are designated on said work path, and interpolation between the via-points is performed so that, if no obstacle exists, the via-points are interpolated by a straight line, or via-points are interpolated by the shortest path that avoids obstacles, if any.

The robot work adjuster 230 may translate the robot work data to define details of the work to be executed by the robot, and may process the robot work data to contain the defined work details and the interpolated work path.

To define the details of work to be executed by the robot in accordance with the exemplary embodiment, the robot work data may be decoded using a translation method associated with the format of the robot work data so as to obtain necessary information, and then the details of the work may be defined based on the obtained information.

Here, the details of work may refer to information that contains a method for robot motions, robot motion duration, a motion speed, a motion type, a motion sequence, and so on.

Figure 4:
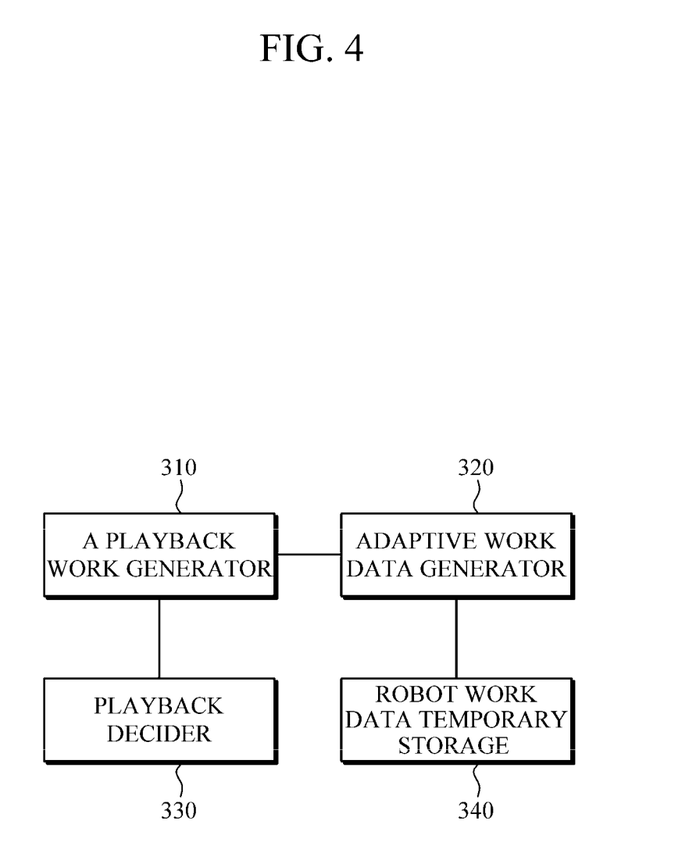
FIG. 4 is a diagram illustrating in detail the robot motion data provider shown in FIG. 1.

FIG. 4 is a diagram illustrating in detail the robot motion data provider shown in FIG. 1.

Referring to FIG. 4, the robot motion data provider 300 includes a playback work generator 310 and an adaptive work data generator 320.

According to the exemplary embodiment, the robot motion data may refer to data that contains a command to control the robot's movements so that the robot can carry out a particular motion to accomplish a task.

The playback work data generator 310 may generate playback work data to control robot motions so that the robot can playback the details of work and the work path regarding repetitive motion which is contained in the processed robot work data.

Here, the playback refers to storing the robot's movements, in advance, in a memory and controlling the robot to reproduce the movements in the actual work process, and although an industrial robot generally repeats the same movement, it can conduct another work if the stored movements are replaced with other movements.

Examples of the robot's movements that are usually changed may be movements of a robot's arm, movements of a robot's hand, and a movement path for a moving robot to check the presence of target of work or an obstacle.

The adaptive work data generator 320 may update the robot's work path by applying the details of work to the interpolated work path at predesignated intervals, and may generate adaptive work data for controlling the robot's motions so that the robot can work according to the updated work path and the details of work.

According to the exemplary embodiment, the adaptive work data may refer to robot work data that contains the robot's work path updated by applying the details of work to the interpolated work path at intervals predesignated by the user so that said work path maintains an optimal condition according to changes in the method for a motion, motion duration, a motion speed, a motion type, and a motion sequence.

For example, in a case where a range of a robot motion was small and hence the robot was able to move along the existing work path without interference from obstacles, if the motion of the robot is changed and the range of motion thereof is thus increased, the work path may be altered so that the robot can move without any obstructions.

According to one exemplary embodiment, the robot motion data provider 300 may further include a playback decider 330 and a robot work data temporary storage 340.

The playback decider 330 may obtain information from the user as to whether the user will use a playback function or not, in order to determine whether to generate playback work data.

According to the exemplary embodiment, in order to obtain the information from the user as to whether the use will use the playback function, the playback decider 330 may issue a message requesting the user for the use of the playback function, and receive an acceptance or refusal of the request from the user; however, aspects of the present disclosure are not limited thereto.

The robot work data temporary storage 340 may temporarily store the processed robot work data in order to generate adaptive work data.

According to the exemplary embodiment, the robot work data temporary storage 340 may delete the temporarily stored robot work data after using it for generating the adaptive work data.

Figure 5:
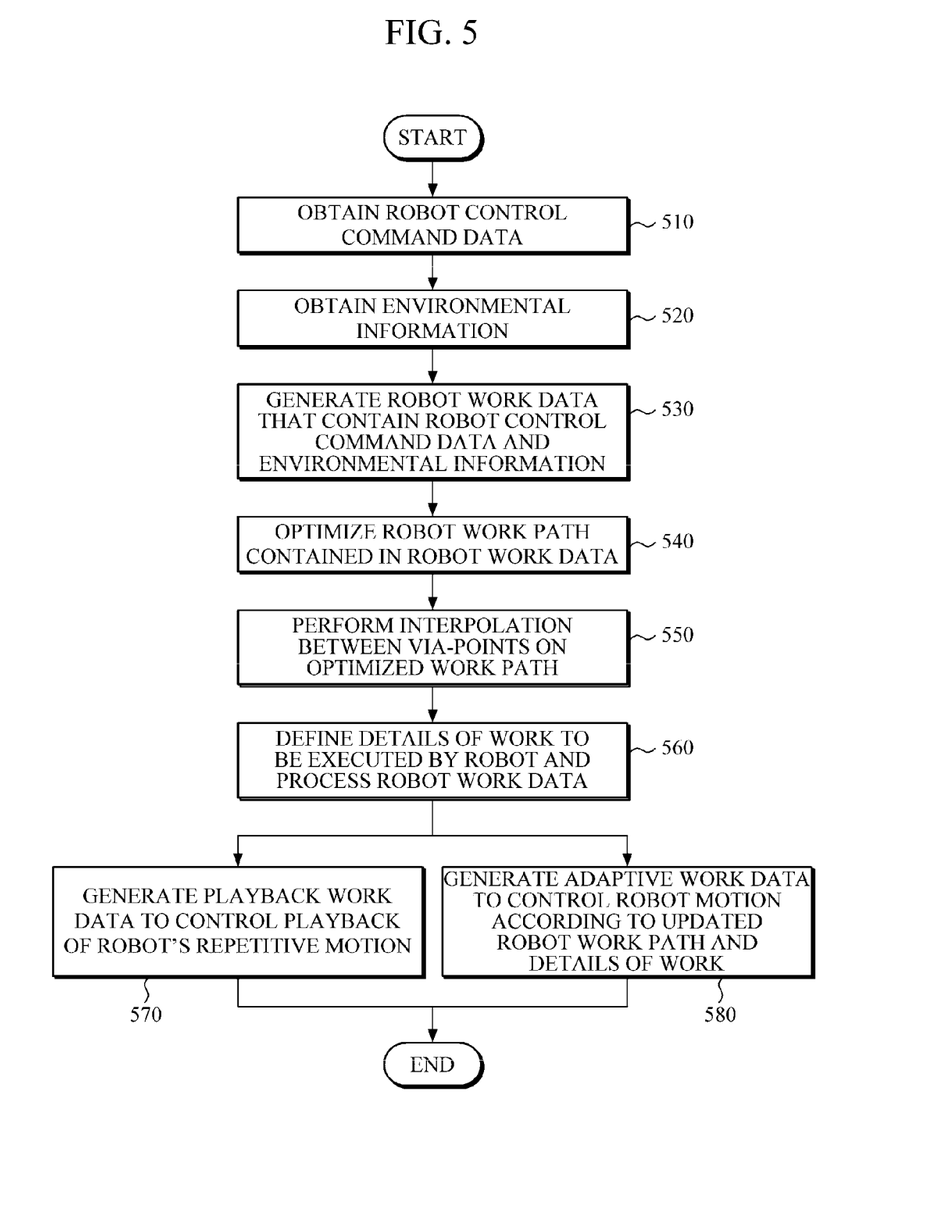
FIG. 5 is a flowchart illustrating a method for providing robot motion data for using a robot at work according to an exemplary embodiment.

FIG. 5 is a flowchart illustrating a method for providing robot motion data for using a robot at work according to an exemplary embodiment.

In 510, robot control command data is obtained.

According to the exemplary embodiment, the robot control command data may be obtained from the user or from previously stored robot control command data.

The robot control command data may refer to data that contains a command to control a robot motion, and it may be received from the user or may be the existing control command data that is retrieved from a database or a storage unit according to the exemplary embodiment.

In 520, environmental information is obtained.

According to the exemplary embodiment, environmental information that contains information about a target of work, work environment, and work path of the robot may be obtained.

The environmental information may contain, as described above, information about a target of work and a work environment and work path of the robot, in which said target may refer to one for which the robot conducts a sequence of particular motions; the work path may refer to a robot's position or an overall distance covered by the robot in order to carry out motions; and the work environment may refer to an external environment of the robot that varies in real time while the robot performs the sequence of particular motions.

Robot work data that contains both the robot control command data and the environmental information is generated, as depicted in 530.

According to the exemplary embodiment, robot work data that contains the obtained robot control command data and environmental information may be generated.

The robot work data refers to data that contains robot control command data and environmental information and contains information that can be used in defining a robot's work that consists of a set of movements which are sequentially connected for a particular purpose. The robot work data may include a work path, working movements, a work sequence, a target of work, a work duration, and the like.

The robot work path is honed, as depicted in 540.

According to the exemplary embodiment, the work path that is honed by smoothing or performing regression on a work path contained in the robot work data.

Here, the smoothing may refer to a data processing method that reduces or eliminates variations or discontinuity in data. In the process of said smoothing, important information of a particular section that is removed concurrently with noise or a section that has been abruptly discontinued can accidently be damaged, so specific information of the sections that are to be removed may be extracted and preserved while the remaining sections are standardized. However, aspects of the present invention are not limited to the above description, such that any smoothing methods that can reduce overall discontinuity or abrupt variations in data can be used.

In addition, the regression may refer to a method for adjusting a work path by performing regression analysis to estimate a relationship between one dependent variable y and two or more independent variables x1, x2, . . . using the least square. However, aspects of the present disclosure are not limited to the above description, such that any methods that can optimize the work path can be used.

Interpolation between via-points on the optimized work path is performed, as depicted in 550.

According to the exemplary embodiment, said interpolation between the via-points may be performed using via-point information contained in the robot work data.

The via-point may refer to a designated point that belongs to the robot's work path, and according to the exemplary embodiment, the via-points are designated on the work path, and interpolation between the via-points is performed so that, if no obstacle exists, the via-points are interpolated by a straight line, or via-points are interpolated by the shortest path that avoids obstacles, if any.

Then, details of work to be executed by the robot are defined and the robot work data is processed, as depicted in 560.

According to the exemplary embodiment, the robot work data may be translated to define the details of work to be executed by the robot, and the robot work data may be processed to contain the defined work details and the interpolated work path.

In this case, to define the details of work to be executed by the robot, the robot work data may be decoded using a translation method associated with the format of the robot work data so as to obtain necessary information, and then the details of the work may be defined based on the obtained information.

In addition, the details of work may refer to information that contains a method for robot motions, robot motion duration, a motion speed, a motion type, a motion sequence, and so on.

Playback work data is generated to control playback of robot's repetitive motion, as depicted in 570.

The robot motion data in accordance with the exemplary embodiment may refer to data that contains a command to control the robot's movements so that the robot can carry out a particular motion to accomplish a task.

According to the exemplary embodiment, playback work data for controlling a robot motion may be generated so that the robot can playback the details of work and the work path regarding repetitive motion which is contained in the processed robot work data.

Here, the playback refers to storing the robot's movements, in advance, in a memory and controlling the robot to reproduce the movements in the actual work process, and although an industrial robot generally repeats the same movement, it can conduct another work if the stored movements are replaced with other movements.

Examples of the robot's movements that are usually changed may be movements of a robot's arm, movements of a robot's hand, and a movement path for a moving robot to check the presence of a target of work or an obstacle.

According to the exemplary embodiment, information is received from the user as to whether the user will use a playback function, in order to determine whether the playback work data is generated or not.

According to the exemplary embodiment, in order to obtain the information from the user as to whether the use will use the playback function, a message requesting the user for the use of the playback function may be issued to the user, and an acceptance or refusal of the request may be received from the user; however, aspects of the present disclosure are not limited thereto.

Adaptive work data is generated to control the robot motion according to the robot's updated work path and the details of work, as depicted in 580.

According to the exemplary embodiment, the robot's work path may be updated by applying the details of work to be executed by the robot to the interpolated work path at predesignated intervals, and the robot work data that contains both the updated work path and the details of work may be generated.

In this case, the adaptive work data may refer to robot work data that contains the robot's work path updated by applying the details of work to the interpolated work path at intervals predesignated by the user so that the robot's work path maintains an optimal condition according to changes in the method for a motion, motion duration, a motion speed, a motion type, and a motion sequence.

For example, in a case where a range of a robot motion was small and hence the robot was able to move along the existing work path without interference from obstacles, if the motion of the robot is changed and the range of motion thereof is thus increased, the robot's work path may be altered so that the robot can move without any obstructions.

According to the exemplary embodiment, the processed robot work data may be temporality stored in order to generate the adaptive work data.

In the present embodiment, the temporality stored robot work data may be deleted after being used for generating the adaptive work data.

According to the exemplary embodiments as described above, a robot's work is defined using the work path and the environmental information, so that robot work data can be provided to control robot motions to actively adapt to changes in the work environment.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for providing robot work data adaptive to changes in a work environment, the apparatus comprising:
   a robot work data provider configured to generate robot work data that contains obtained robot control command data and obtained environmental information;
   a robot work data processor configured to:
      optimize a work path of a robot, the work path being contained in the robot work data;
      interpolate the work path using via-point information contained in the robot work data by determining a shortest path that avoids obstacles between two via-points in the work path;
      define details of work to be executed by the robot by translating the robot work data; and
      process robot work data to contain the defined details of work and the interpolated work path; and
   a robot motion data provider configured to generate playback work data to control a robot motion so that the robot playbacks a repetitive motion to carry out the work, as well as the work path contained in the robot work data or to generate adaptive work data to control the robot motion so that the work path is changed by updating the work path while applying the details of work to the interpolated work path.

2. The apparatus of claim 1, wherein the robot work data provider comprises:
   a robot control command data obtainer configured to obtain the robot control command data from a user or obtain previously stored robot control command data;
   an environmental information obtainer configured to obtain the environmental information that contains information about a target of work and work environment and work path of the robot; and
   a robot work data generator configured to generate the robot work data that contains both the robot control command data and environmental information obtained.

3. The apparatus of claim 1, wherein the robot work data processor comprises:
   a work path optimizer configured to optimize the work path by smoothing or performing regression on the work path contained in the robot work data;
   a work path interpolator configured to perform interpolation between via-points on the optimized work path using via-point information contained in the robot work data; and
   a robot work adjuster configured to define the details of work to be executed by the robot by translating the robot work data and process the robot work data to contain the defined details of work and the interpolated work path.

4. The apparatus of claim 1, wherein the robot work data provider comprises
   a playback work data generator configured to generate playback work data to control a robot motion so that the robot can playback the details of work and the work path regarding repetitive motion to carry out the work which is contained in the processed robot work data, and
   an adaptive work data generator configured to update the work path by reflecting the details of work to the interpolated work path at predesignated intervals, and generate the adaptive work data to control the robot motion so that the robot can work according to the updated work path and the details of work.

5. The apparatus of claim 4, wherein the robot work data provider comprises a playback decider configured to obtain information from the user as to whether the user will use a playback function, in order to determine whether to generate the playback work data, and a robot work data temporary storage configured to temporarily store the processed robot work data, in order to generate the adaptive work data.

6. A method for providing robot work data adaptive to changes in a work environment, the method comprising:
   generating, by a robot work data provider, robot work data that contains obtained robot control command data and obtained environmental information;
   optimizing, by a robot work data processor, a work path of a robot, the work path being contained in the robot work data;
   interpolating, by the robot work data processor, the work path using via-point information contained in the robot work data by determining a shortest path that avoids obstacles between two via-points in the work path;
   defining, by the robot work data processor, details of work to be executed by the robot by translating the robot work data;
   processing, by the robot work data processor, robot work data to contain the defined details of work and the interpolated work path; and generating, by a robot motion data provider, playback work data to control a robot motion so that the robot playbacks a repetitive motion to carry out the work, as well as the work path contained in the robot work data or generating, by the robot motion data provider, adaptive work data to control the robot motion so that the work path is changed by updating the work path while reflecting the details of work to the interpolated work path.

7. The method of claim 6, wherein the generating of the robot work data comprises:
   obtaining the robot control command data from a user or obtaining previously stored robot control command data;
   obtaining the environmental information that contains information about an target of work and work environment and work path of the robot; and
   generating the robot work data that contains both the robot control command data and environmental information obtained.

8. The method of claim 6, wherein the processing of the robot work data comprises:
   optimizing the work path by smoothing or performing regression on the work path contained in the robot work data;
   performing interpolation between via-points on the optimized work path using via-point information contained in the robot work data; and
   defining the details of work to be executed by the robot by translating the robot work data and processing the robot work data to contain the defined details of work and the interpolated work path.

9. The method of claim 6, wherein the generating of the robot motion data comprises:
   generating playback work data to control a robot motion so that the robot can playback the details of work and the work path regarding repetitive motion to carry out the work which is contained in the processed robot work data;
   updating the work path by reflecting the details of work to the interpolated work path at predesignated intervals; and
   generating the adaptive work data to control the robot motion so that the robot can work according to the updated work path and the details of work.

10. The method of claim 9, wherein the generating of the robot motion data comprises obtaining information from the user as to whether the user will use a playback function, in order to determine whether to generate the playback work data, and temporarily storing the processed robot work data, in order to generate the adaptive work data.

* * * * *